United States Patent [19]

Taylor, Jr.

[11] Patent Number: 4,940,988
[45] Date of Patent: Jul. 10, 1990

[54] TWO PARAMETER CLUTTER MAP

[75] Inventor: John W. Taylor, Jr., Baltimore, Md.

[73] Assignee: Westinghouse Electric Corp., Pittsburgh, Pa.

[21] Appl. No.: 266,192

[22] Filed: Nov. 2, 1988

[51] Int. Cl.⁵ .................................. G01S 13/86
[52] U.S. Cl. ........................ 342/93; 342/159; 342/195
[58] Field of Search ................. 342/91–93, 342/159, 195

[56] References Cited

U.S. PATENT DOCUMENTS

| | | | |
|---|---|---|---|
| 3,513,471 | 5/1970 | Mooney, Jr. et al. | 342/91 |
| 3,587,097 | 6/1971 | Stull, Jr. | 342/93 |
| 3,643,257 | 2/1972 | Thomson et al. | 342/92 |
| 3,787,848 | 1/1974 | Laundry et al. | 342/91 X |
| 3,825,930 | 7/1974 | Davies | 342/91 |
| 3,913,104 | 10/1975 | Adrian et al. | 342/92 X |
| 3,995,270 | 11/1976 | Perry et al. | 342/93 |
| 4,031,364 | 6/1977 | Wilmot | 342/93 X |
| 4,067,012 | 1/1978 | Platt et al. | 342/159 X |
| 4,068,231 | 1/1978 | Wilmot | 342/159 X |
| 4,074,264 | 2/1978 | Wilmont | 342/91 X |
| 4,104,631 | 8/1978 | Weigle et al. | 342/159 X |
| 4,144,533 | 3/1979 | Van Hijfte et al. | 342/92 |
| 4,151,523 | 4/1979 | Platt et al. | 342/159 X |
| 4,231,037 | 10/1980 | Long | 342/159 X |
| 4,375,640 | 3/1983 | Harvey | 342/93 |
| 4,386,353 | 5/1983 | Bleijerveld et al. | 342/91 |
| 4,422,074 | 12/1983 | Williams et al. | 342/93 |
| 4,488,154 | 12/1984 | Ward | 342/93 X |
| 4,586,043 | 4/1986 | Wolf | 342/93 |
| 4,742,353 | 5/1988 | D'Addio et al. | 342/159 |
| 4,749,994 | 6/1988 | Taylor, Jr. | 342/93 X |

Primary Examiner—Thomas H. Tarcza
Assistant Examiner—Bernarr Earl Gregory

[57] ABSTRACT

A two-parameter clutter map for storing two variables for every spatial location in order to define both the intensity of the interference and the fluctuation characteristics of the interference from scan-to-scan. The two variables are obtained by processing input data from an integrator in two n-pole integrators having different orders. The ratio of the two variables or their difference in logarithmic form is employed as a measure of the scan-to-scan fluctuation characteristics. An option to control alarms and the leading edge of moving rain storms is also provided.

23 Claims, 2 Drawing Sheets

TWO PARAMETER CLUTTER MAP

BACKGROUND OF THE INVENTION

(1) Field of the Invention

The present invention is directed to a two parameter clutter map which provides control of false alarms from clutter interference in a radar receiver by storing estimates of the clutter characteristics in each resolution cell. The maps store two measured parameters of clutter at each spatial location to define its mean echo strength and scan-to-scan fluctuation characteristics. In addition, alarms on leading edges of moving rain storms can also be controlled.

(2) Description of Related Art

The prior art radars, particularly moving target detector types, employ a fine-grain clutter map having cells less than a beamwidth times a pulse width to estimate the mean echo voltage for each spatial location. The detection threshold is the sum in decibels (dB) of the map value and an operator selectable margin.

In order to obtain an accurate estimate of the mean average, many scans are necessary. Inaccurate estimates demand a loss in sensitivity in order to maintain a constant false alarm rate (CFAR). In addition, a target on a tangential flight path can impact a given map cell for many scans causing an apparent azimuth shift in the detected target. This leaves a trail of lower sensitivity behind each target. In order to minimize the above effects a sluggish map response is desirable.

In contrast, rain storms create changing interference conditions at a given map location. To prevent excessive alarms caused by the leading edges of the storms, a fairly rapid map response is desired. This presents a conflict with the sluggish map response necessary to obtain an accurate estimate of the mean. A satisfactory compromise is not available since long range radars have long scan periods.

Another limitation associated with this type of clutter map is that it presumes that the scan-to-scan fluctuation characteristics of all varieties of clutter are identical to the fluctuation characteristics of noise. In reality, terrain clutter echoes are generally considered to have fluctuating (ac) and non-fluctuating (dc) components. The ac to dc ratio depends on the extent of foliage cover and wind velocity. The dc component represents not only immovable objects but also the moving foliage when movement is a small fraction of a wavelength.

In moving target detectors, multiple echoes received as the beam scans across a target are coherently integrated in a bank of Doppler filters. In the Doppler filters responding to zero Doppler, the fluctuation characteristics of noise and clutter are preserved since there is no post-detection integration. Because noise fluctuations have no dc component, their fluctuations are worse than terrain clutter, and the map works well to control alarms from the terrain clutter. Although sensitivity is reduced more than necessary in areas where clutter fluctuations are less extreme, this is a tolerable sacrifice.

In radars which employ post-detection integration, pulse-to-pulse fluctuations are attenuated by the integration process. The wider the spectrum of interference relative to the radar pulse repetition frequency, the greater the attenuation of the input fluctuation by the integration process. Noise fluctuations are attenuated most and terrain clutter is attenuated least. Using this type of clutter map (e.g., estimating mean interference voltage or power) sacrifices most of the sensitivity benefit of post-detection integration in noisy areas because the detection threshold has to be set far above that necessary for noise in order to tolerate the more severe scan-to-scan fluctuations from clutter. The increase in transmitter power for this type of map is generally unacceptable.

The present invention solves the above problems, allowing post-detection integration to be employed for improving sensitivity of the radar without sacrificing false alarm control.

SUMMARY OF THE INVENTION

An object of the present invention is to provide a two parameter clutter map which employs post-detection integration to improve the sensitivity of radar without sacrificing false alarm control.

Another object of the present invention is to provide a two parameter clutter map in which two variables are provided by processing input data from n-pole integrators having different orders, the ratio of the two variables being a measure of the scan-to-scan fluctuation characteristic.

Another object of the present invention is to provide a two parameter clutter map in which the two parameters are in logarithmic format.

Another object of the present invention is to provide a two parameter clutter map for preventing excessive alarms at the leading edge of moving rain storms by employing the largest detection threshold within a fixed radius of each map cell.

The above-mentioned objects are achieved by providing a clutter map including antenna means, receiver means for receiving echoes from the antenna means, dwell time integration means for receiving data from each spatial location on the clutter map and integrating the data, processor means including n-pole integration means for simultaneously calculating two variables having different parameters and storing the two variables in the clutter map, and memory means for storing a predetermined boost factor for computing a detection threshold in accordance with the boost factor. The boost factor can be based on a logarithmic difference in the two variables, or a ratio of the two variables if they are in linear form. The clutter data at each spatial location is obtained by integrating the number of echoes received from that location as the antenna scans past, for example, 10 echo powers, on two frequencies which are sufficiently separated to provide independent exponential fluctuation of the ac component of clutter cross-section. The data can be in logarithmic format so that the difference between the two parameters can be obtained. The n-pole integration means can be single pole, double pole, etc., integrators. The receiver means may include a plurality of receivers, one of the receivers being dedicated to weather.

The n-pole integration means includes a first feedback integrator, a first memory connected to the first feedback integrator, a second feedback integrator and a second memory connected to the second feedback integrator. The first feedback integrator is a first order integrator and the second feedback integrator is a higher order feedback integrator, for example, a third order feedback integrator. A subtractor compares the outputs from the first and second feedback integrators and senses fluctuations in the input signals, the difference between the outputs from the first and second integrators being proportional to a level of fluctuation at the output. The fluctuation at the output distinguishes between the clutter types in the clutter map. Further, the fluctuation parameter determines the amount by which the output of the first feedback integrator is to be boosted so as to obtain a detection threshold level with an acceptable alarm rate from the clutter.

In addition, a method is provided for measuring two parameters of clutter in a clutter map. The method includes receiving data from a scan at each spatial location of a clutter map, weighting and integrating the echoes received during the scan, calculating two variables having different parameters and subtracting the two parameters for providing an address to a PROM. That is multiple echoes received from a given spatial location on the clutter map are integrated to form a single value for the latest scan, which is then raised to different powers or orders for subsequent processing. Integration means is provided and includes two feedback integrators with separate memories used to compute the detection threshold by comparing the two outputs to determine fluctuations in the input, the difference being proportional to the level of fluctuations at the output of the integrators. The difference between the outputs is used for determining an amount by which the output of a first one of the two integrators must be boosted, the difference being employed as a look-up address to the PROM, determining the boost factor in accordance with the look-up address of the PROM, and adding the boost factor to the output of the first one of the two integrators to form a detection threshold.

These objects, together with other objects and advantages which will be subsequently apparent, reside in the details, construction and operation as more fully hereinafter described and claimed, reference being had to the accompanying drawings forming a part hereof, wherein like reference numerals refer to like parts throughout.

DESCRIPTION OF THE PREFERRED EMBODIMENT

In the present invention, a clutter map is provided having two parameters stored therein. The parameters are a result of an n-pole integration of data received from prior scans at each spatial location in the clutter map.

Figure 1:
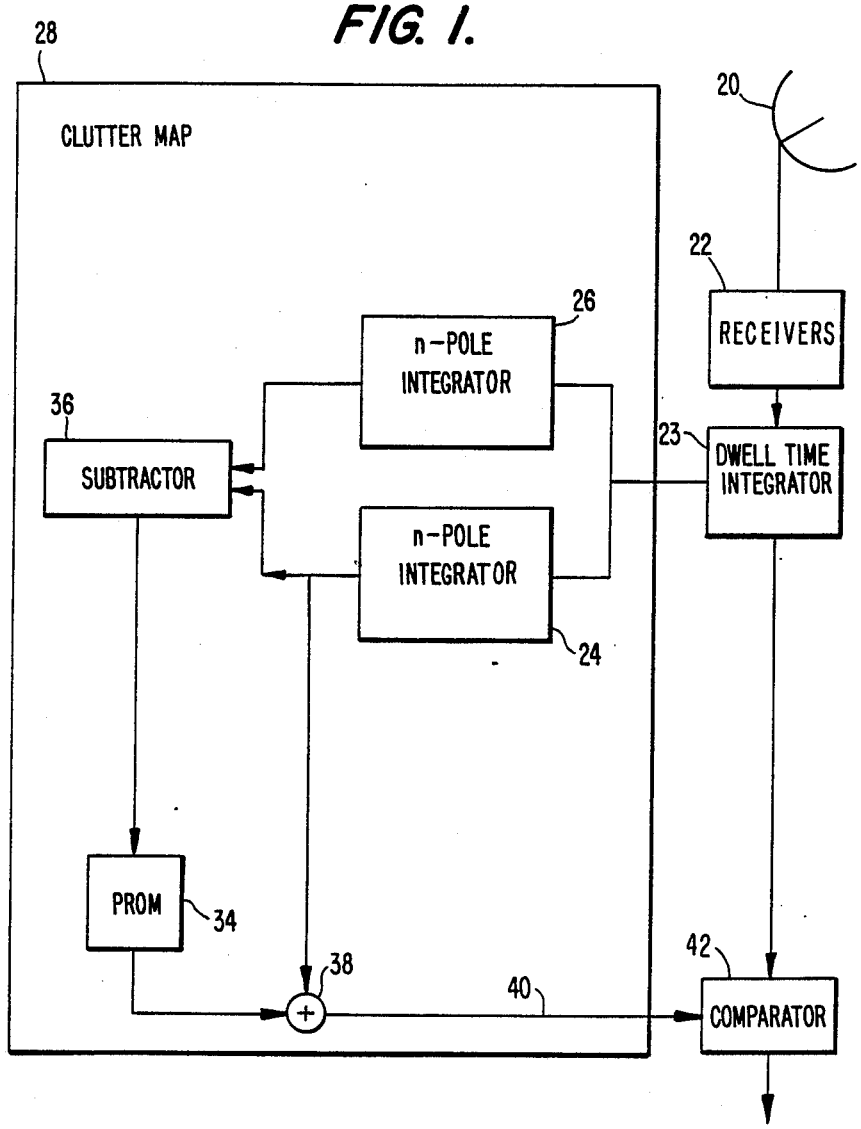
FIG. 1 is a block diagram of two parameter clutter map according to the present invention.

FIG. 1 is a block diagram of a system according to the present invention. An antenna beam from an antenna 20 scans across a target. Receiver means 22 receives echo data from the antenna. The data from each individual scan is accumulated in a dwell time integration means 23 which receives multiple echoes from the receiver means 22 and integrates and outputs the data. The echoes (voltage or power) may be weighted uniformly or non-uniformly by the dwell time integration means 23 such as single-pole or double-pole, feedback integrators which are exponential in nature, or by any other weighting function or means. The dwell time integration means 23 performs post-detection integration which is a well known technique for improving the sensitivity of a radar (see The Radar Handbook, McGraw Hill, 1989 Edition). An integrated voltage ($V_i$) is input to a clutter map 28, wherein "i" indicates the age of the data, i.e., the number of scans. The data is preferably provided in logarithmic format to allow a large dynamic range of radar echoes to be handled by 10 to 12 bits of digital data. $Log_2$ is generally used because of the ease of conversion of binary data so that the least significant bit is a binary fraction of 3 dB (e.g., 3/32 dB). The two parameters stored in the clutter map 28 are two different root-mean-power estimates derived from prior scans and are determined by the following equation:

$$x_n = \frac{1}{n} Log_2 \left[ 1/k \sum_{i=0}^{\alpha} V_i^n \epsilon^{-i/k} \right]$$

where
 V = Integrated voltage from a map location on the latest scan
 i = Age of data input (scans)
 k = Time constant of the n-pole integrators (scans)
 n = 1 Generates mean
 n = 2 Generates Root-Mean-Square (RMS)
 n = 3 Generates Root-Mean-Cube (RMC)

This calculation is performed in integration means 24 and 26 using different values for n, e.g., 1 and 3, respectively. The integration means 24 is a lower order integration means and the integration means 26 is a higher order integration means.

The subtraction of the stored parameters (both in $Log_2$ format) occurs in a subtractor 36 and provides an address to a PROM 34. The difference between the two forms of stored data provides a fluctuation parameter $\Delta$ which acts as an address to the PROM 34 containing the boost factor. The boost factor from the PROM 34 is output and added to the output of the lower order integration means 24 to form a detection threshold 40. If the output of the dwell time integration means 23 exceeds the detection threshold 40 when compared in a comparator 42 a target report is generated.

The present invention provides the simultaneous calculation and storage in a clutter map 28 of two $x_n$ variables having different n parameters. An example will now be explained using n1 = 1, n2 = 3 and k = 8. However, it should be noted that the present invention is not restricted to these parameters or to integer parameters. The clutter map performance was evaluated using a radar providing input data for a map by integrating ten echoes on each of two frequencies which are sufficiently separated to provide independent exponential fluctuation of clutter cross-section about a mean value at a given spatial location.

In the clutter map processing, a boost factor for each clutter type is calculated to achieve a probability of false alarm (PFA) of $10^{-6}$. The boost factors are calculated based on the distributions of the $\Delta$ values calculated by the clutter map 28 for each clutter type. These distributions are calculated assuming only a particular clutter type exists in the cell. The measured $\Delta$ values may not unambiguously determine what type of clutter is present. Therefore, the value of the boost factor is then determined for the given value of $\Delta$, assuming that any type of clutter may be present in the cell.

Boost factors are a function of the $\Delta$ curve and are determined using, for example, a computer simulation model. Boost factors can also be determined by accumulating data during actual operation.

In order to calculate the boost factors required to achieve a probability of false alarm (PFA) of $10^{-6}$ for each clutter type, a computer model of the clutter map 28 and its inputs can be used. The temporal fluctuations of the clutter are modelled with a Gaussian distribution having a variance input by the user. The clutter power is divided between an ac (time varying) and dc (constant) component according to a user input of 9 dc/ac ratio. Wind is assumed to vary the dc/ac ratio, but produces insignificant effects on the width of the ac spectrum in contrast to the specified model. Alarms must be controlled under the more difficult environments as well as under the specified conditions. The clutter is modelled as being correlated pulse-to-pulse by adding only one sample for each frequency channel. Ten noise samples are generated as zero mean and are added to the samples for each channel. The output from each channel is then summed to obtain the input to the clutter map 28. The input to the clutter map 28 represents the present measurement of the total power in the cell. For each iteration, the difference between the present total power in the cell and the stored estimate of the mean power in the cell is output. Then, a cumulative probability distribution of these output differences is determined. The boost factor is chosen to correspond to a probability of occurrence of a false alarm of $10^{-6}$. In order to reduce the number of iterations required to achieve a boost factor for a probability of false alarm of $10^{-6}$ importance sampling is employed. Thus, for each iteration, one set of random numbers is generated. The random numbers are then used without importance sampling to generate input values for updating the previous estimate of the mean value. The same random numbers are then used with importance sampling to generate input values for determining the difference between the present power measurement and the previous estimate of the mean value.

Figure 2A:
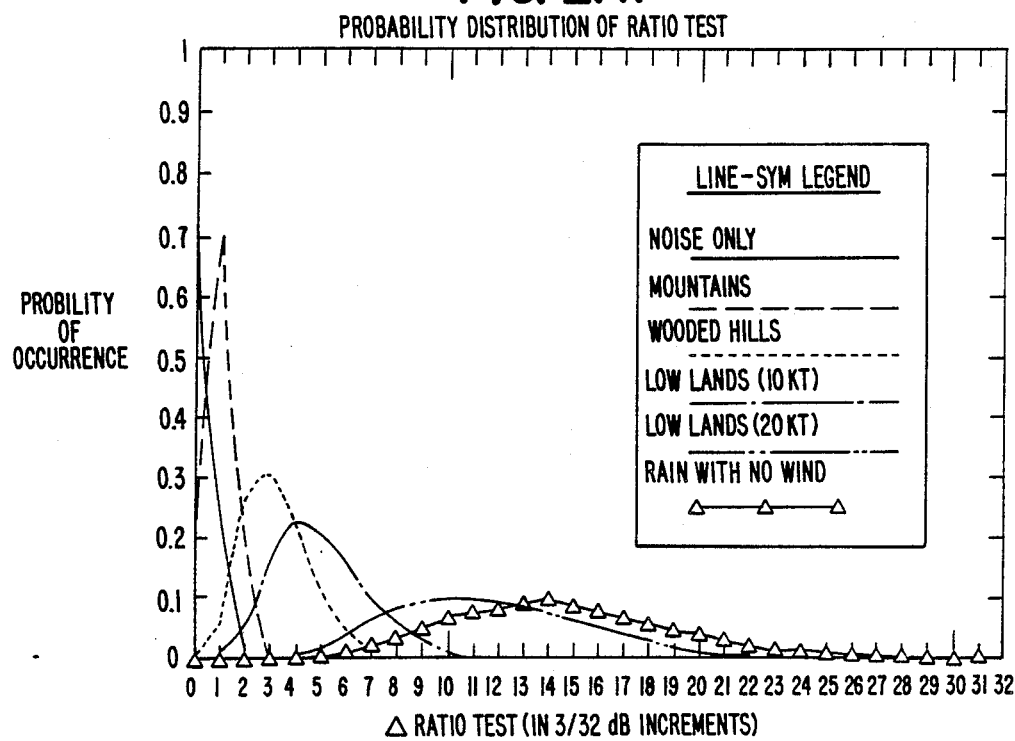
FIGS. 2A and 2B are graphs of the probability distributions of different types of clutter and boost factor, respectively, according to the two parameter clutter map of the present invention.

Distributions of $\Delta$ for each clutter type are calculated using the difference between the integration means 24 and 26 for each iteration. The same computer models that are used for the previous calculations are also used, but importance sampling is not employed since a large number of iterations are not required. Each of the clutter types results in a different distribution for $\Delta$, as shown in FIG. 2A.

Figure 2B:
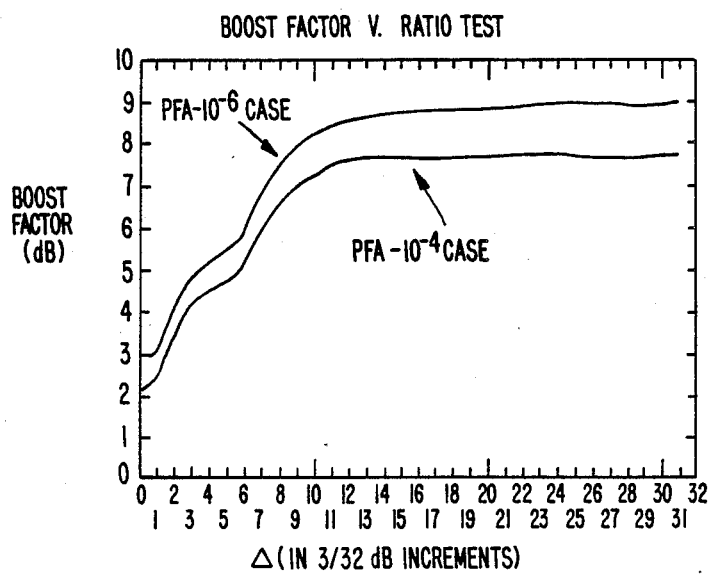

The boost factors generated assume that the type of clutter in the present cell is known. Distribution curves of $\Delta$ for the different types of clutter, however, overlap. Different clutter types can have a significant probability of resulting in the same value for $\Delta$. Since different clutter types require different boost factors for achieving a probability of false alarm of $10^{-6}$, the boost factor is calculated assuming any clutter must be present in the cell. In order to obtain this result, for each value of $\Delta$, a weighted average of the particular boost factor for each clutter type is taken. The weights are the probabilities that each clutter type results in a particular value of $\Delta$. For example, for $\Delta=0$, the resulting boost factor equals the boost factor for mountains times the probability that mountains result in $\Delta=0$, plus the boost factor for low lands times the probability that low lands result in $\Delta=0$, etc. The resultant boost factors are shown in FIG. 2B.

Integration of 20 samples of receiver noise provides a clutter map input having only minor fluctuations from scan-to-scan. A model for barren mountains provides similarly low values of $\Delta$ as shown in FIG. 2A. This is because the ac content of the noise is very small. FIG. 2B shows low boost factors for the low values of $\Delta$ in FIG. 2A and indicates that the benefit of post-detection integration for improving detection of aircraft noise is maintained.

The clutter map 28 of the present invention is also an adaptive device which senses incoming clutter and raises the detection threshold to a level such that the false alarm rate does not change. The clutter map receives from each cell an input which represents an integration over two frequencies. The present input is used as an address to obtain a value stored in the PROM 34. The clutter map 28 then proceeds to update the present estimate of the mean value and computes a new detection threshold. This operation is described hereinbelow.

In order to update the detection threshold, the integration means 24 and 26, which can be, for example, two independent $\frac{1}{8}$ feedback integrators, process the present input with a stored estimate of the mean value for a cell in order to update the estimate of the mean value. One of the integration means 24 and 26 can be, for example a first order integrator and the other one can be a third order integrator. In this case, the output from the third order integrator is raised to $\frac{1}{3}$ power in order to scale it down to the level of the output of the first order integrator. Comparison of the two outputs then takes place in a subtractor 36 to sense scan-to-scan fluctuations in the input. The third order integrator reacts more to differences in the present input and the stored output than does the first order integrator. Therefore, the difference between the outputs of the integrators 24 and 26 is proportional to the level of fluctuation at the output. This difference, as stated above, acts as the fluctuation parameter $\Delta$, and allows the clutter map to distinguish between clutter types. The fluctuation parameter $\Delta$ is the only information with which the clutter map 28 can do this.

Once computed, the clutter map 28 uses the fluctuation parameter $\Delta$ to determine the amount by which the first order integrator output must be boosted to form a suitable detection threshold 40. The boost factor is available in the form of data stored in the PROM 34. The value of $\Delta$ acts as a look-up address to the PROM 34 and the boost factor is then output from the PROM 34. The clutter map 28 adds the boost factor to the output of the first order integrator at the adder 38 to determine the detection threshold 40.

Determining the approach of a storm is helpful since clutter maps tend to react slowly to changing conditions. In the present invention, one of a plurality of receivers in the receiver means 22 for receiving echoes is specifically dedicated to weather, e.g., it is circular polarized to receive the rain echo. The other receivers reject weather so that there is no interference with detecting a target. Therefore, the present invention provides a clutter map which can quickly and accurately determine a detection threshold without excessive alarms.

Cellular rain storms or frontal systems can cause false alarms at the leading edges as they move into map cells where lower detection threshold are normally desired. The clutter map 28 requires approximately k scans (the parameters of the cells and the wind velocity or rain dictate the number of scans) to react to the changing clutter environment. This is a common fault in prior clutter maps also, and it is exaggerated in radars having long scan periods, for example, 12 seconds. In prior art clutter maps, the alarms caused by the rain edges are excessive.

An option in the clutter map of the present invention is to employ the largest detection threshold in a surrounding area which is sufficient in size so that one map cell could react to the approaching storm. This option should be activated by a weather map only in areas where significant rain is detected since it degrades one of the virtues of the clutter map which is the interclutter visibility related to small map cells. Interclutter visibility is the ability to see, for an example, an aircraft between two hills, the first hill blocking the clutter from the intervening valley.

In addition, clutter echoes which have narrow Doppler spectra and large ac components are not smoothed by post-detection integration. They produce large fluctuations from scan-to-scan, generating large Δ's and high boost factors. Prior art post-detection integration provides no benefit in detecting aircraft over such clutter, e.g., low land clutter under high wind conditions, rain having a dominant freezing layer "bright band" having little wind shear, and sea clutter. The clutter map of the present invention, however, works well in relatively stationary processes which produce exponential fluctuation of the ac component of the radar cross-section. This includes land clutter, distributed rain clutter, and sea clutter (with circular or vertical polarization). Horizontal polarization produces a much longer tail on the sea clutter distribution than the exponential fluctuation. The spikey character depends on sea state (the condition of the sea) and grazing angle (the angle at which the radar is looking at a target) and makes control of false alarms extremely difficult. Prior art clutter maps use only a single stored value for each spatial location and therefore cannot distinguish between the different clutter and noise characteristics in order to control false alarms. Therefore, they must employ a boost factor adequate for the worst clutter conditions. This requires a large sensitivity sacrifice in noise (6 dB). Since the benefit of post-detection integration is nullified it is generally omitted. This is in contrast to the present invention which has the feature of retaining the benefits of post-detection integration, and as above-mentioned, overcomes the disadvantages of the prior art.

The foregoing is considered as illustrative only of the principles of the invention. Further, since numerous modifications and changes will readily occur to those skilled in the art, it is not desired to limit the invention to the exact construction and applications shown and described, and accordingly, all suitable modifications and equivalents may be resorted to, falling within the true scope of the invention and the appended claims and their equivalents.

What is claimed is:

1. A clutter map system, comprising:
   antenna means for scanning a target;
   receiver means for receiving echoes from said antenna means;
   dwell time integration means, for receiving multiple echoes during the time said antenna means scans a given spatial location, accumulating and integrating the echoes and outputting data;
   means, including n-pole integration means, n being an integer greater than or equal to one, for receiving the data and simultaneously calculating two variables having different parameters; and
   means for storing a predetermined boost factor for computing a detection threshold.

2. A clutter map system according to claim 1, wherein said storing means stores a predetermined boost factor in accordance with a logarithmic difference in the two variables.

3. A clutter map system according to claim 1, wherein said receiver means includes a plurality of receivers, one of said receivers dedicated to weather.

4. A clutter map system according to claim 3, wherein said n-pole integration means is a single-pole integration means.

5. A clutter map system according to claim 3, wherein said n-pole integration means is a double-pole integration means.

6. A clutter map system according to claim 1, wherein said dwell time integration means obtains data from each spatial location by integrating ten echoes on two frequencies sufficiently separated to provide independent exponential fluctuation of clutter cross-section.

7. A clutter map system according to claim 1, wherein said storing means comprises a PROM.

8. A clutter map system according to claim 1, wherein said n-pole integration means comprise:
   a first feedback integrator operatively connected to said dwell time integration means; and
   a second feedback integrator operatively connected to said dwell time integration means.

9. A clutter map system according to claim 8, wherein said first feedback integrator is a first order integrator, and wherein said second feedback integrator is a third order feedback integrator.

10. A clutter map system according to claim 9, wherein said storing means stores a predetermined boost factor.

11. A clutter map system according to claim 9, wherein said storing means stores a boost factor, an address of the boost factor determined in accordance with a ratio of outputs from said first and second feedback integrators, the boost factor being added to an output from said first order first feedback integrator for obtaining the detection threshold.

12. A clutter map according to claim 8, wherein said n-pole integration means converts the two variables into logarithmic form, and wherein said clutter map further comprises:
   a subtractor connected between said first and second feedback integrators and said storing means, for comparing the outputs from said first and second feedback integrators and sensing fluctuations in input signals, the difference between the outputs from said first and second integrators being proportional to a level of fluctuation, the level of fluctuation being input to said storing means as an address for obtaining the boost factor.

13. A clutter map system according to claim 12, wherein the difference between the outputs of said first and second integrators is a fluctuation parameter allowing the clutter map to distinguish between clutter types.

14. A clutter map system according to claim 13, further comprising adding means, coupled to said first feedback integrator and said storing means, for adding the boost factor to the output of said first feedback integrator and obtaining the detection threshold.

15. A clutter map system including a clutter map, antenna means for scanning a target, receiver means for receiving echoes from the antenna means, and dwell time integration means for receiving multiple echoes during the time the antenna means scans the target, for accumulating and integrating the echoes and for outputting data, said clutter map comprising:

processor means, coupled to the dwell time integration means, for receiving the data, and simultaneously calculating two variables having different parameters, said processor means including:

n-pole integration means, n being an integer greater than or equal to one, said n-pole integration means including:

a first feedback integrator operatively connected to the dwell time integration means; and a second feedback integrator operatively connected to the dwell time integrator means, said first feedback integrator being a low order integrator and said second feedback integrator being a higher order feedback integrator than said low order integrator, each of said first and second feedback integrators outputting signals in logarithmic format;

means for storing a predetermined boost factor used for computing a detection threshold;

a subtractor, connected between said first and second feedback integrators and said storing means, for comparing the logarithmic outputs from said first and second feedback integrators and sensing fluctuations in input signals, the difference between the logarithmic outputs from said first and second integrators being proportional to a level of fluctuation, the level of fluctuation being input as an address to said storing means for obtaining the boost factor; and adding means, connected to said first feedback integrator and said storing means, for adding the boost factor to the output of said first feedback integrator for obtaining the detection threshold.

16. A clutter map system according to claim 15, wherein said low order feedback integrator comprises a first order integrator and wherein said higher order feedback integrator comprises a third order integrator.

17. A method for employing two parameters of clutter in a clutter map, said method comprising the steps of:

(a) receiving data from a scan at each spatial location of the clutter map;

(b) weighting and integrating echoes received during the scan;

(c) calculating two variables having different parameters in accordance with the integrated echoes; and (d) subtracting the two variables for providing an address to a PROM.

18. A method according to claim 17, wherein said step (c) comprises converting the two variables into logarithmic format.

19. A method according to claim 17, wherein said step (b) comprises the substep of integrating ten echoes on each of two frequencies.

20. A method according to claim 19, further comprising the steps of:

(e) obtaining a boost value stored in the PROM in accordance with the address obtained in said step (d);

(f) comparing one of the variables with the boost value; and (g) computing a detection threshold in accordance with the boost value and one of the variables, the detection threshold being a level at which a false alarm does not change.

21. A method for employing two parameters of clutter in a clutter map, said method comprising the steps of:

(a) receiving data as echoes from a scan at each spatial location of the clutter map;

(b) weighting and integrating the echoes received on each of two frequencies during the scan;

(c) calculating two variables having different parameters in accordance with the integrated echoes;

(d) converting the two variables into logarithmic format;

(e) subtracting the two parameters for providing a look-up address to a PROM memory location wherein there is stored a boost factor; and (f) computing a detection threshold in accordance with the boost factor and one of the two variables, the detection threshold being a level at which a false alarm rate does not change.

22. A method according to claim 21, wherein said step (b) comprises the substep of weighting the echoes uniformly.

23. A method according to claim 21, wherein said step (b) comprises the substep of weighting the echoes non-uniformly.

* * * * *